United States Patent
Rajapakse

(10) Patent No.: US 11,356,729 B2
(45) Date of Patent: *Jun. 7, 2022

(54) CROSS-PLATFORM MEDIA REDIRECTION AND INTEROPERABILITY

(71) Applicant: Roku, Inc., San Jose, CA (US)

(72) Inventor: Ravi Rajapakse, San Francisco, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/610,265

(22) PCT Filed: May 3, 2018

(86) PCT No.: PCT/US2018/030801
§ 371 (c)(1),
(2) Date: Nov. 1, 2019

(87) PCT Pub. No.: WO2018/204585
PCT Pub. Date: Nov. 8, 2018

(65) Prior Publication Data
US 2021/0105523 A1 Apr. 8, 2021

Related U.S. Application Data

(60) Provisional application No. 62/501,037, filed on May 3, 2017.

(51) Int. Cl.
| H04N 21/436 | (2011.01) |
| H04N 21/439 | (2011.01) |
| H04N 21/472 | (2011.01) |

(52) U.S. Cl.
CPC ......... *H04N 21/436* (2013.01); *H04N 21/439* (2013.01); *H04N 21/472* (2013.01)

(58) Field of Classification Search
CPC ........ G06F 3/165; H03G 3/20; H03G 3/3005; H03G 5/165; H04R 2227/003; H04R 2227/005; H04R 2420/01; H04R 2420/07; H04R 27/00; H04R 3/12; H04R 5/04; H04S 2400/01; H04S 7/30
See application file for complete search history.

(56) References Cited

U.S. PATENT DOCUMENTS

| 2014/0286507 A1* | 9/2014 | Kallai | H04R 3/12 381/120 |
| 2015/0172742 A1* | 6/2015 | Richardson | H04N 21/44 725/10 |

\* cited by examiner

*Primary Examiner* — Rong Le
(74) *Attorney, Agent, or Firm* — Sterne, Kessler, Goldstein & Fox P.L.L.C.

(57) ABSTRACT

A media controller application that enables a user to select source and destination services and devices for media playback that provides an interoperability layer between different service and device ecosystems, and a media redirection hardware adapter that connects to a host device using a physical connector and receives audio and then retransmits at least a portion of the audio wirelessly.

20 Claims, 10 Drawing Sheets

CROSS-PLATFORM MEDIA REDIRECTION AND INTEROPERABILITY

CROSS-REFERENCE TO RELATED APPLICATIONS

| Application No. | Date Filed | Title |
|---|---|---|
| Current application | Herewith | CROSS-PLATFORM MEDIA REDIRECTION AND INTEROPERABILITY Is a National Phase Entry (371) filing of: |
| PCT/US18/30801 | May 3, 2018 | CROSS-PLATFORM MEDIA REDIRECTION AND INTEROPERABILITY which is a PCT filing of and claims benefit of, and priority to: |
| 62/501,037 | May 3, 2017 | CROSS-PLATFORM MEDIA REDIRECTION AND INTEROPERABILITY | the entire specification of each of which is incorporated herein by reference.

BACKGROUND

Field of the Art

The disclosure relates to the field of computing devices, and more particularly to the field of media computing devices.

Discussion of the State of the Art

Many different manufacturers offer over-the-top ("OTT") services and hardware devices for delivering media to users in various ways (for example, SONOS™, ROKU™, PANDORA™, GOOGLE PLAY™, and other media services and devices). In many cases, proprietary hardware is needed, and each device operates within an isolated manufacturer ecosystem that may not be capable of interacting with services or devices from other manufacturers (often utilizing proprietary formats or interfaces). Moreover, many hardware and software vendors are actively developing their own branded media content, and these vendors often try to limit playback of their own content to their own or their partners' systems. The emergence of "walled gardens" and the multiplication of proprietary hardware devices and interface protocols has tended to "balkanize" home entertainment systems, and to make their use frustratingly complex for consumers. Moreover, many consumers use wireless extensively today, for example by using sophisticated wireless speaker systems; it is crucial and increasingly difficult to deliver high-quality, tightly synchronized audio and video in these conditions, while minimizing latency—this is usually difficult to accomplish in wireless environments in any case, but becomes much more so when multiple vendors using various protocols and technologies all try to make use of the same wireless infrastructure in home environments.

What is needed then, is a cross-platform media redirection solution that can bring interoperability to hardware and software from various vendors regardless of their out-of-the-box capabilities.

SUMMARY

Accordingly, the inventor has conceived and reduced to practice, systems and methods for cross-platform media redirection and interoperability, that enables hardware-based audio redirection for any device with audio output capability, as well as software-based media redirection between vendor services and devices using a unified interface.

According to one aspect, a media controller comprising: a processor; a memory; a plurality of wireless network interfaces; and a plurality of programming instructions stored in the processor and operating on the memory, and configured to: provide an interactive user interface; configured to select at least a portion of a plurality of devices visible on a network based at least in part on a received user interaction; identify a plurality of device characteristics of a selected device via one of the plurality of wireless network interfaces; direct the operation of at least a portion of the plurality of media processing components based on at least a portion of the identified device characteristics, is disclosed.

According to another aspect, a media redirection hardware adapter, comprising: a processor; a memory; an audio controller operating an audio interface; a plurality of wireless network interfaces; an audio redirector comprising at least a plurality of programming instructions stored in the memory and operating on the processor, and configured to: connect to a host device using at least the audio interface; receive audio media signals from an audio source; process at least a portion of the audio media signals, the processing comprising at least a de-multiplexing operation that produces a plurality of audio channels; and send at least a portion of the de-multiplexed audio channels to a plurality of external audio playback devices via at least one of the plurality of wireless network interfaces, is disclosed.

According to another aspect, a method for cross-platform media redirection and interoperability, comprising the steps of: connecting, using a media redirection hardware adapter comprising a processor, a memory, a plurality of wireless network interfaces, and an audio interface, to a host device using at least the audio interface; receiving a plurality of audio media signals from an audio source; processing, using an audio redirector comprising at least a plurality of programming instructions stored in the memory and operating on the processor, at least a portion of the audio media signals, the processing comprising at least a de-multiplexing operation that produces a plurality of audio channels; and sending at least a portion of the de-multiplexed audio channels to a plurality of external audio playback devices via at least one of the plurality of wireless network interfaces, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
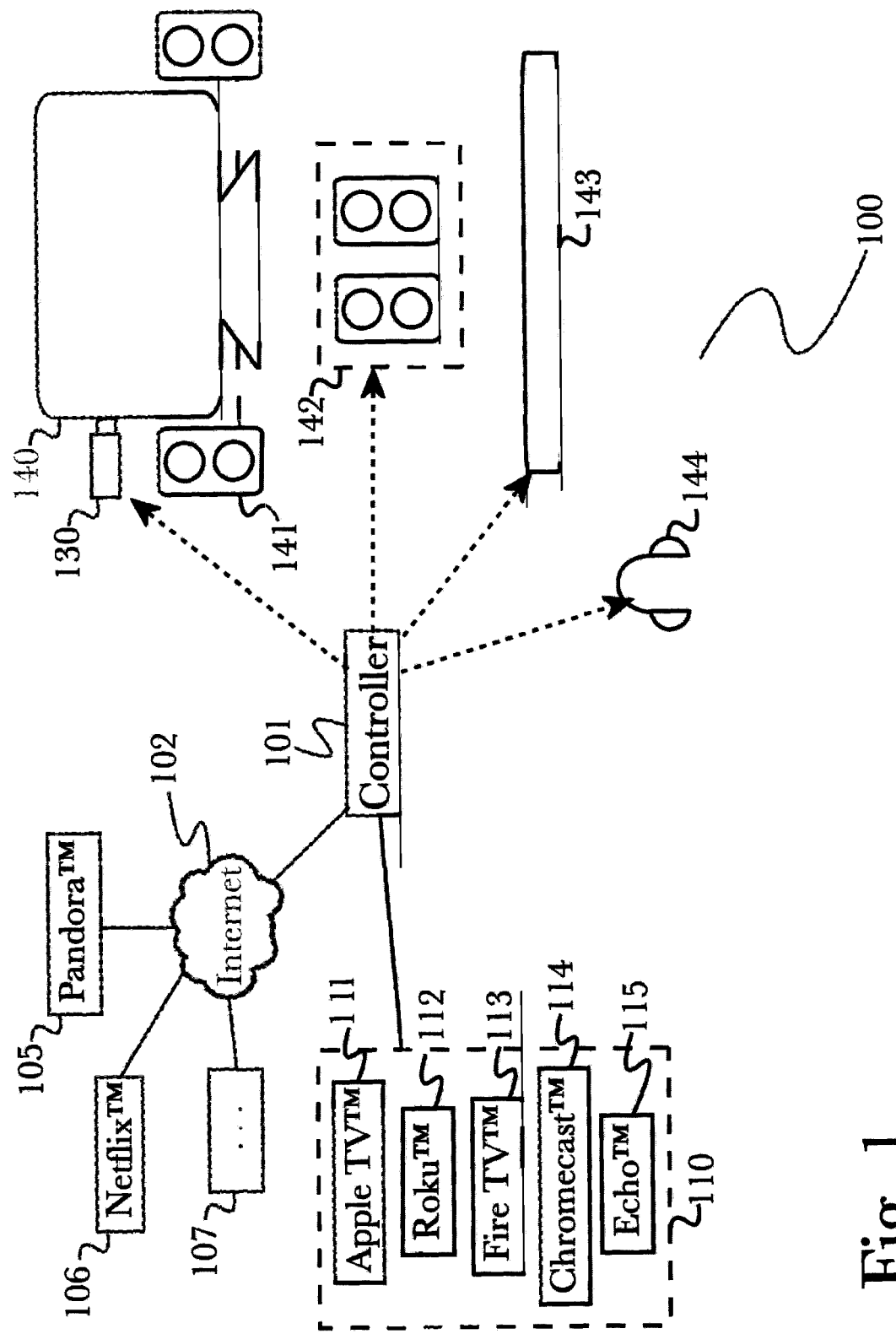
FIG. 1 is a block diagram illustrating an exemplary system architecture for a cross-platform media redirection system, according to one aspect.

The inventor has conceived, and reduced to practice, systems and methods for cross-platform media redirection and interoperability, that enables hardware-based audio redirection for any device with audio output capability, as well as software-based media redirection between vendor services and devices using a unified interface.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for a cross-platform media redirection system, according to one aspect. According to the aspect, media controller 101 may comprise a media controller software application operating on a user's device (for example, a smartphone, laptop, or tablet computing device), that may operate software-based networking and multimedia capabilities such as including (for example, and not limited to) file sharing via a number of protocols (for example, SMB, NFS, FTP, HTTP/S, etc), streaming media content from a variety of providers and devices and using a variety of transmission methods, file types, or media encoding schema (for example, MPEG audio and/or video, WAV audio, audio encoded using various lossless audio codecs such as FLAC or ALAC audio file types, MKV multimedia container files, etc.), media transcoding or up/down scaling to adapt a particular media stream for retransmission to another destination, or other capabilities useful for viewing, interacting with, or modifying media over a network. These capabilities provide a means to receive media from a variety of sources, perform any necessary conversion or other processing on at least a portion of the media, and then retransmit at least a portion of the media for playback at another device over the network. This provides a cross-platform interoperability regardless of the particular capabilities of any one source or destination device or service, without the need for any custom configuration of network devices or alterations to a user's media library.

Media controller 101 may receive raw media inputs from a variety of input sources, for example including Internet-based media streaming services such as PANDORA™ 105, NETFLIX™ 106, and other similar services 107 via the Internet 102. Media hub 101 may also receive raw media from a plurality of OTT devices 110 such as including, but not limited to, APPLE TV™ 111, ROKU™ 112, AMAZON FIRE TV™ 113, GOOGLE CHROMECAST™ 114, and other AMAZON™ devices such as ECHO™ 115, or any of a variety of additional or alternate devices that are available or may be introduced. Some of these devices 110 may communicate with media controller 101 wirelessly such as using a Wi-Fi local area network (LAN), and some may be directly connected via one or more physical ports on wireless media hub 101. Media controller 101 may send high-definition video wirelessly to a video dongle 130 which may in turn be inserted into an HDMI or other port (for example, DISPLAYPORT™ or USB™ ports) of display device 140 (which may be a conventional television, a smart television, a computer display monitor, or another media display device). Media controller 101 may also stream audio wirelessly to one or more audio playback devices synchronously, such as (but not limited to) headphones 144, wireless speakers 141, 142, wireless sound bar 143, and so forth. In some arrangements, media controller 101 may send audio and video to a connected multimedia dongle 130, which may then play video via a connected display device 140 and audio via connected audio devices such as speakers 141 connected to the display device 140 (for example, in a home theater setup with multiple speakers connected to a television). In some other arrangements, media controller 101 may be used in conjunction with an audio redirection hardware adapter 200 (as shown below, referring to FIG. 2 and FIG. 7) connected to a media device, to utilize the network or audio redirection capabilities of the hardware adapter 200 to expand the capabilities of the media arrangement.

Examples of how a media controller 101 may be used are many. For example, a user may select a movie from a cloud-based service such as NETFLIX™ or AMAZON PRIME™ and direct the video via an HDMI output or a wireless video dongle to a television, while sending the audio wirelessly to a set of speakers to provide a rich audio experience. The user may select how audio is distributed, may select what is to be viewed, and may control viewing settings, all from within an application operating on their device, retaining the familiarity with their particular device's software and hardware interaction experience.

Figure 2:
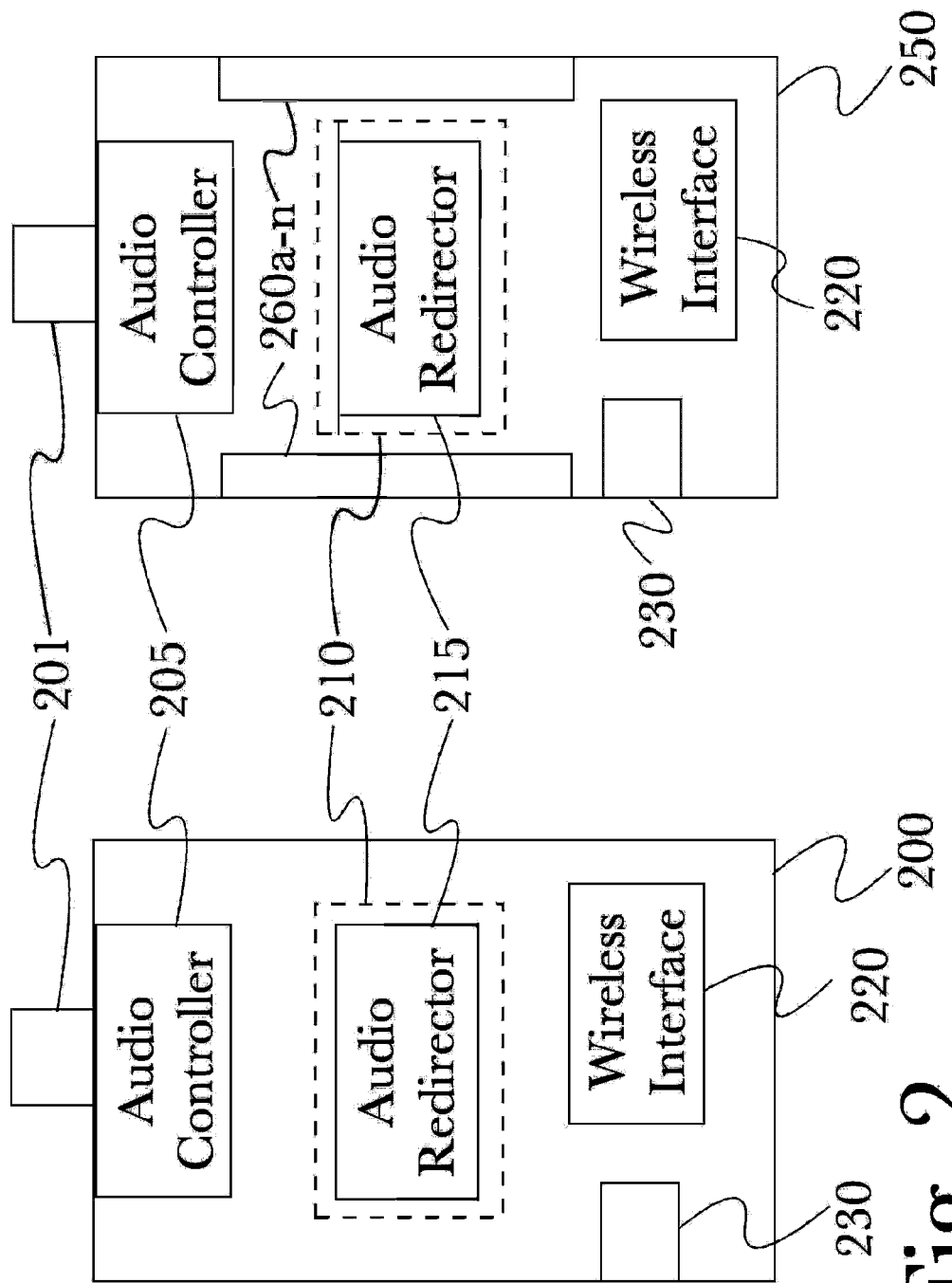
FIG. 2 is a block diagram illustrating an exemplary system architecture for a cross-platform media redirection hardware adapter, showing two alternate hardware configurations, according to one aspect.

FIG. 2 is a block diagram illustrating an exemplary system architecture for a cross-platform media redirection hardware adapter 200, showing two alternate hardware configurations, according to one aspect. In a first hardware arrangement 210, a media redirection hardware adapter (MRHA) 200 may comprise a system-on-a-chip 215 further comprising a memory 11 and a processor 12 (as described below, referring to FIG. 4), configured to operate without integral hardware display or input devices (such as, for example, a computer monitor or keyboard as are commonly present in computing devices), and configured to perform audio interception and redirection using an audio redirector 216 that may be used to intercept and redirect incoming audio streams received via audio connector 205 and provided by audio controller 201. Some audio connectors 205 provide power along with the audio signal to connected devices (for example, to operate headphones that do not have a power source of their own), however if this power supply is insufficient a dedicated power supply 230 may be used to plug into another power source such as a wall outlet or USB port, to provide the level of power needed to operate the full functionality of MRHA 200.

Audio intercepted by audio redirector 216 may be modified to separate the audio channels present (generally at least two, but any number may be possible) and then optionally provide each individual channel to a wireless interface 220 for retransmission to network-connected destination devices (such as wireless speakers, such that each speaker will play a single audio channel such as to provide a multichannel immersive audio arrangement, or for enabling positional audio using individual speakers to isolate sounds to particular physical locations within the room or media hardware setup), or these channels may be used to enhance the audio prior to retransmission, such as to duplicate and/or modify audio channels to produce more channels than were present in the source audio. For example, a standard tip-ring-sleeve (TRS) audio connector, regardless of physical size (common sizes include 2.5 mm, 3.5 mm, and ¼" diameter connectors), can only provide two discrete audio channels via hardware (as the third contact is used for the ground connection), and any additional channels must be provided through software multiplexing. This may be used to provide software-emulated surround or positional audio capability using an audio redirection hardware adapter, by intercepting a stereo (two-channel) audio signal from a source device, and then using software processing to produce a number of additional channels to expand the audio as needed, then retransmitting the original audio and any new channels produced for output via wireless interface 220.

In an alternate hardware arrangement 250, a plurality of integral speakers 260a-n may be utilized to enable MRHA 200 to render some or all audio channels without the need for external destination devices. This may be used, for example, to provide a number of additional output devices to increase the number of available channels for use in audio processing and redirection as described above, or to provide native audio output capability to a device that does not have such capability, such as some personal music players that are designed without speakers and rely on an audio connector 205 to play audio through a connected output device, such as a user's headphones.

Many media devices such as speakers or media players are capable of both transmitting and receiving audio via a hardware audio connector 205. When connected to an audio input on a host device, MRHA 200 may be used to receive audio via wireless interface 220, process via audio redirector 216 as described above, and optionally provide a number of audio channels as output via audio connector 205 for playback on the connected host device. For example, this may be used to connect audio redirector to an input-only audio port on (for example) a speaker that is designed to receive audio but is not designed to provide audio for playback over a hardware port. In such an arrangement, the audio redirection capabilities of MRHA 200 may still be used, and rather than receiving audio from audio connector 205 and retransmitting via wireless interface 220, audio is received via wireless interface 220 and retransmitted via a combination of audio connector 205 and wireless interface 220. In this way it can be seen that audio may be intercepted, processed, and retransmitted in a multi-directional manner, adapting to the capabilities of the devices and connections used in a user's media setup. Another exemplary use may be to connect to an audio port and use only the power provided by the host device, while audio is both received and transmitted exclusively through wireless interface 220. This may be used to power MRHA 200 without the use of a power cable or external power source, by connecting to an audio port on a device that is not part of a media playback arrangement, or by connecting to a port that provides only power and no data signals.

Operation of MRHA 200 may be controlled or configured wirelessly using a media controller application 101 (as described previously in FIG. 1), for example so that a user can select how they want audio channels to be processed and retransmitted, or so that a user can select whether to use integral speakers 260*a-n*, or other configuration. Additionally, if the hardware capabilities of a host device allow it, the host device's specific capabilities may be identified via the hardware connector 205 and exposed via wireless interface 220, providing networking capabilities to audio devices that may not natively have them. For example, a hardware speaker with no networking capability may be used as a host device in this manner, and the MRHA 200 now provides networking capability for the speaker while also optionally providing the audio redirection and retransmission capabilities described above. This can be used to extend the functionality of a media hardware setup, as well as to enable devices with no network capabilities of their own to be used in a network-based media arrangement, furthering the cross-platform capabilities of the system regardless of the hardware capabilities of any individual device.

It should be noted that, while an audio connector is used in the example of FIG. 2 and is discussed throughout, other similar media interfaces may be used in place of an audio connector, according to various arrangements. For example, HDMI or DISPLAYPORT™ interfaces may be used; in such arrangements, audio controller 201 and audio interface 205 would be instead an HDMI or DISPLAYPORT™ controller 201 and interface 205; similarly, other newly emerging media interfaces may be used in various embodiments of the invention. When using alternate physical connectors, additional or alternate processing capabilities may be enabled such as video processing and redirection (for example, to stream video to one device and audio to others), or to draw power from a mobile high-definition link (MHL) compliant port such as an HDMI port.

Detailed Description of Exemplary Aspects

Figure 3:
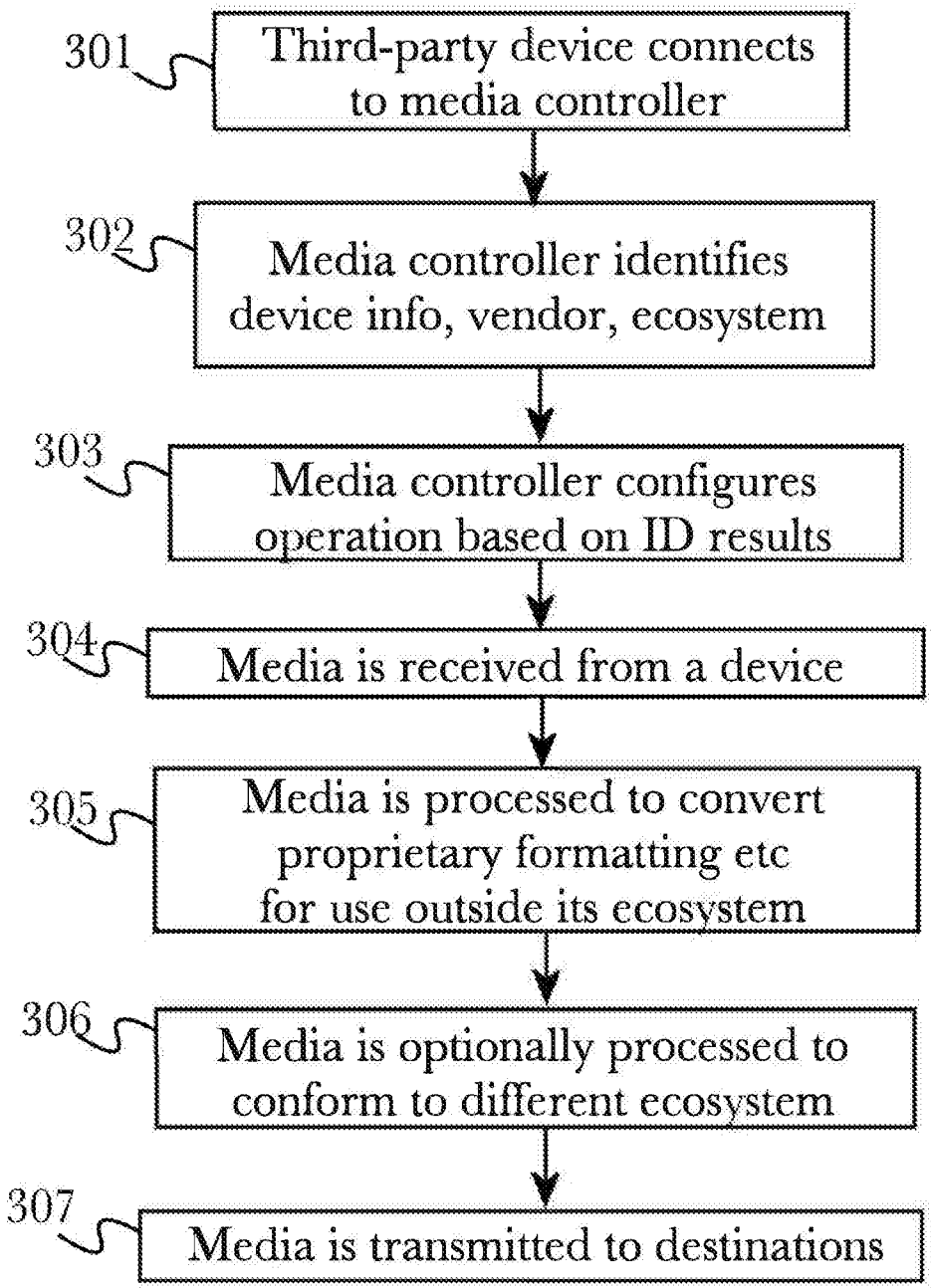
FIG. 3 is a flow diagram illustrating an exemplary method for cross-platform media redirection using a media controller application, according to one aspect.

FIG. 3 is a flow diagram illustrating an exemplary method 300 for cross-platform media redirection using a media controller application, according to one aspect. According to the aspect, in an initial step 301 a third-party device connects to media controller 101 over a network. In a next step 302, media controller 101 may identify a connected device's characteristics, including vendor information and the device's software ecosystem (for example, any proprietary file or communication formats that may be utilized, or device-specific media types or sources such as Internet streaming sources available as channels on the device). In a next step 303, media controller 101 may configure processing operations based on identified device ecosystem and other characteristics, for example so that media may be processed to convert or encapsulate proprietary information into "device agnostic" or universal types for compatibility with devices from other vendors or that do not conform to a particular ecosystem. In a next step 304, media is received and then in a next step 305 it may be processed to convert any proprietary formatting (such as media protocols or file container formats) into a form that is compatible with a destination device or that is not device-specific for broad compatibility. In a next step 306, media may optionally be processed to conform to a particular destination ecosystem, for example for transmission to a device that has specific configuration parameters or rules for receiving media, or to take advantage of features offered by a particular ecosystem on a destination device (such as specific audio formats such as lossless compression, or specific software interface features that may depend on or interact with specific media characteristics, such as looking up information on actors present in a scene using embedded metadata, or other such uses), and then in a final step 307 media is transmitted to destination devices in formats appropriate for their configuration. Additionally, some processing operations for bridging media between device ecosystems may rely on emulating a media source or destination device to the third-party OTT device, for example media controller 101 may identify itself as a television to a device that is configured only to provide direct media output to a destination, such as a media streaming stick or APPLE TV™. In this manner, devices from different vendors may be used in conjunction with each other regardless of software or hardware limitations, for example media may be selected for streaming from an APPLE TV™ device and processed for transmission to a CHROMECAST™ device as a destination, when ordinarily these devices are not designed to interact with each other and are configured to interact directly with a television or other destination or output device directly. In this manner, media controller 101 may be utilized in a many-to-many configuration, serving as a central hub for a wide variety of device and ecosystem types for broad compatibility and interaction.

Figure 4:
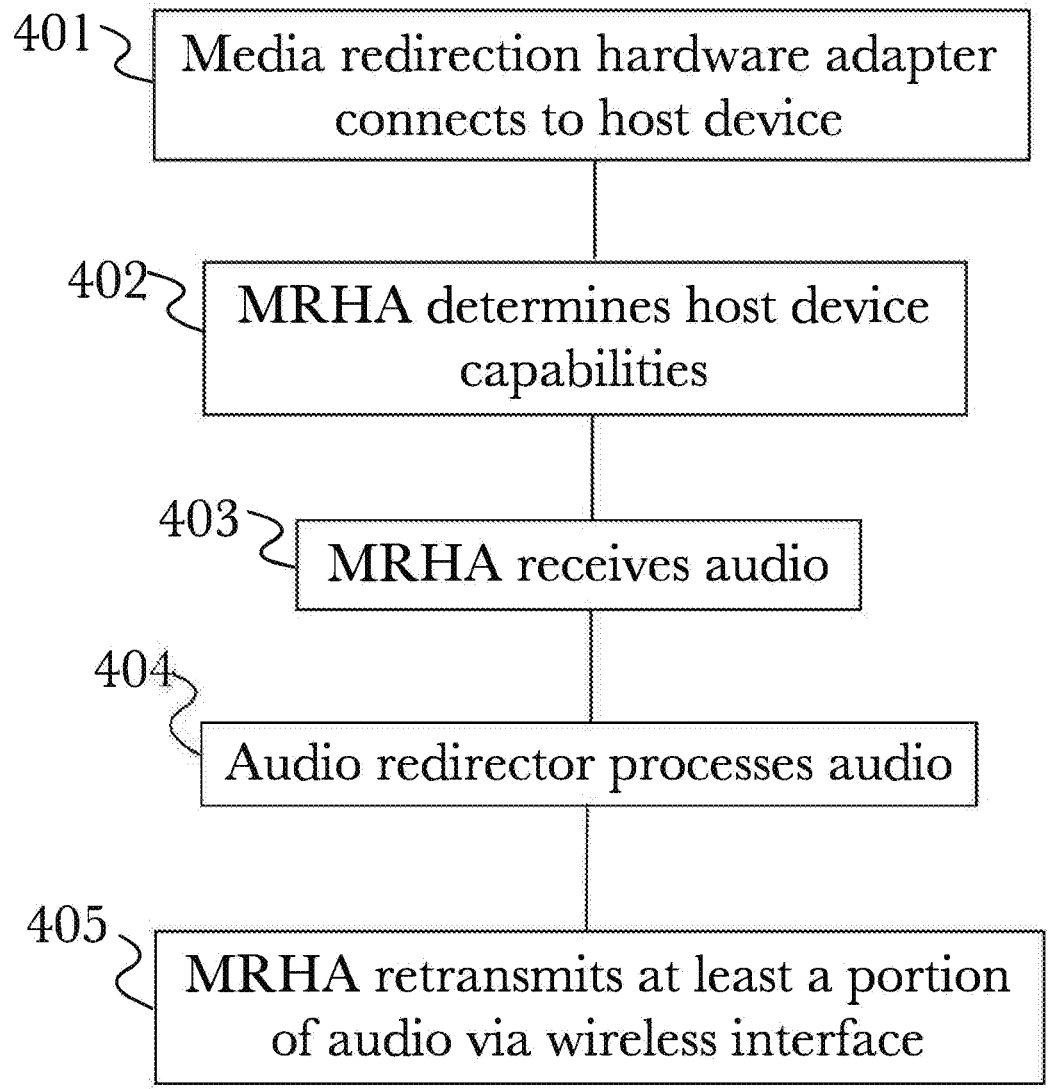
FIG. 4 is a flow diagram illustrating an exemplary method for cross-platform audio redirection using a hardware adapter, according to one aspect.

FIG. 4 is a flow diagram illustrating an exemplary method for cross-platform audio redirection using a hardware adapter, according to one aspect. According to the aspect, a media redirection hardware adapter (MRHA) 200 may be connected to a host device 401, for example via an audio connector or HDMI port. MRHA 200 may then determine the host capabilities 402, for example the connected port may be optionally used for input and/or output according to the particular configuration or capabilities of the port or host device. For example, an audio port may be configured by the host device for output of audio to play on external devices, and therefore used as input by MRHA 200, or it may be configured for use as input such as from a microphone, and therefore used as an output connection by MRHA 200. MRHA may then receive audio content 403 from a source device, for example either the host device via the connected hardware port or from a network device via a wireless interface 220, according to a particular configuration or use case. Received audio may then be processed 404 using an audio redirector 216 operating on MRHA 200, for example to transcode or remux audio channels as described above with reference to FIG. 2. Processed audio may then be used as output, with at least a portion of the audio being retransmitted 405 via wireless interface 220 for playback on a plurality of network devices such as wireless speakers or other media playback devices. Additionally, at least a portion of the audio may optionally be provided as output via the connected hardware port to the host device, for example if the host device is configured to receive audio input via the port and is configured to be used as a destination device in the current arrangement (for example, by a user directing the operation of the MRHA 200 using a media controller application 101, as described previously in FIG. 1).

Figure 5:
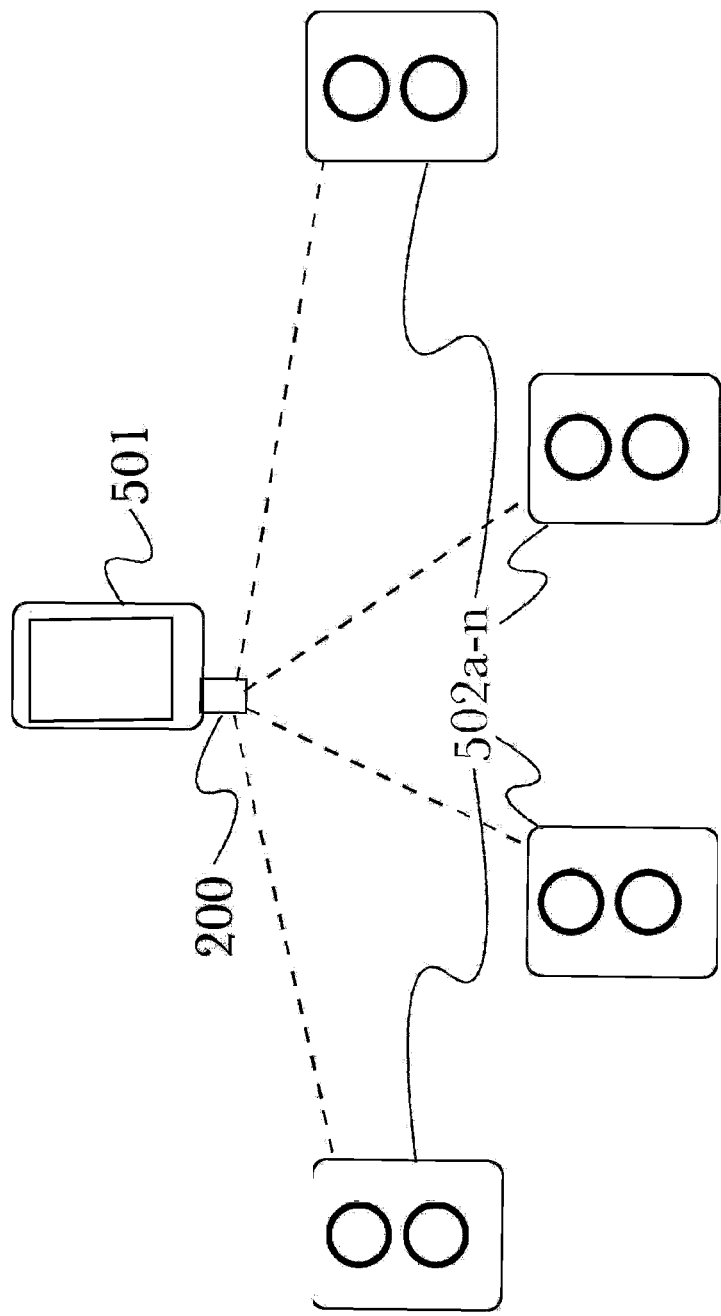
FIG. 5 is an illustration of an exemplary usage arrangement, illustrating the use of an audio redirection hardware adapter with several wireless speakers.

FIG. 5 is an illustration of an exemplary usage arrangement, illustrating the use of a media redirection hardware adapter with several wireless speakers. According to the arrangement shown, an MRHA 200 may be connected to a media device 501 such as (for example) a personal media player such as an MP3 player or a user's phone. Depending on the specific configuration of the media device 501, MRHA 200 may draw power directly from the host device connection without the need for additional cables or connection to a power source such as a wall socket, and MRHA 200 may optionally be used to provide audio output capabilities that the host device 501 may not ordinarily have (for example, many MP3 players do not have internal speakers and are designed to function with an external output device connected). MRHA 200 may then intercept audio produced by the host device 501, process at least a portion of the audio using an audio redirector component 216 (as described previously in FIG. 2), and then retransmit at least a portion of the audio to each of a plurality of network devices such as (for example, including but not limited to) wireless speakers 502*a-n*.

Figure 6:
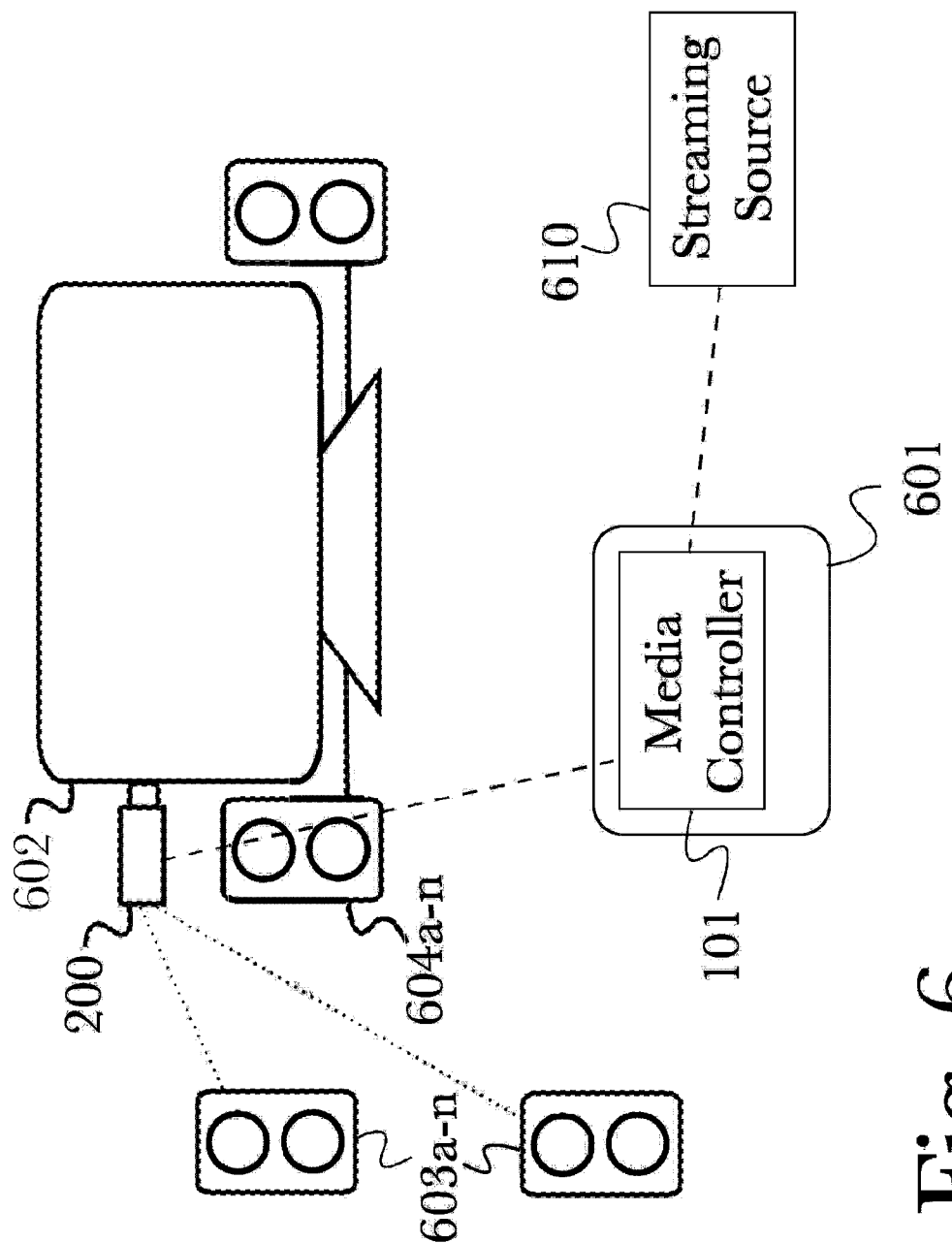
FIG. 6 is an illustration of an exemplary usage arrangement, illustrating the use of a media controller application on a mobile device as well as an audio redirection hardware adapter within a home media setup.

FIG. 6 is an illustration of an exemplary usage arrangement, illustrating the use of a media controller application on a mobile device as well as a media redirection hardware adapter within a home media setup. According to the arrangement shown, a user may use their mobile device 601 to interact with a media controller 101, selecting media for playback and devices to be used during playback. For example, a user may select media for streaming from a variety of online media streaming sources 610 such as (for example, including but not limited to) NETFLIX™ or PANDORA™. This media may then be transmitted to a MRHA 200 connected to a host device such as a television 602. MRHA 200 may use an audio redirector 216 (as described previously in FIG. 2) to retransmit channels from the audio portion of the streaming media to a plurality of wireless speakers 603*a-n*, while providing a video portion for playback on the host device 602, and optionally providing at least a portion of the audio for playback such as using connected speakers 604*a-n* controlled by the host device 602. In another example, a user may select media stored locally on their device 601 for playback, which may then be streamed to MRHA 200 for rebroadcasting to wireless speakers 603*a-n* and playback via TV 602. In this manner, it can be seen that combining the media library interoperability of a media controller 101 and the redirection and retransmission capabilities of a MRHA 200, a user may enjoy media from a wide variety of sources using a wide variety of playback devices and arrangements, regardless of the configuration of any particular device or media source involved as the media controller 101 and MRHA 200 adapt to the capabilities of the sources, devices, and arrangement used and provide for full cross-platform compatibility in a manner that is fully transparent to the user, requiring no additional configuration or setup to use media and devices the user already has in an arrangement of their choosing.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 7:
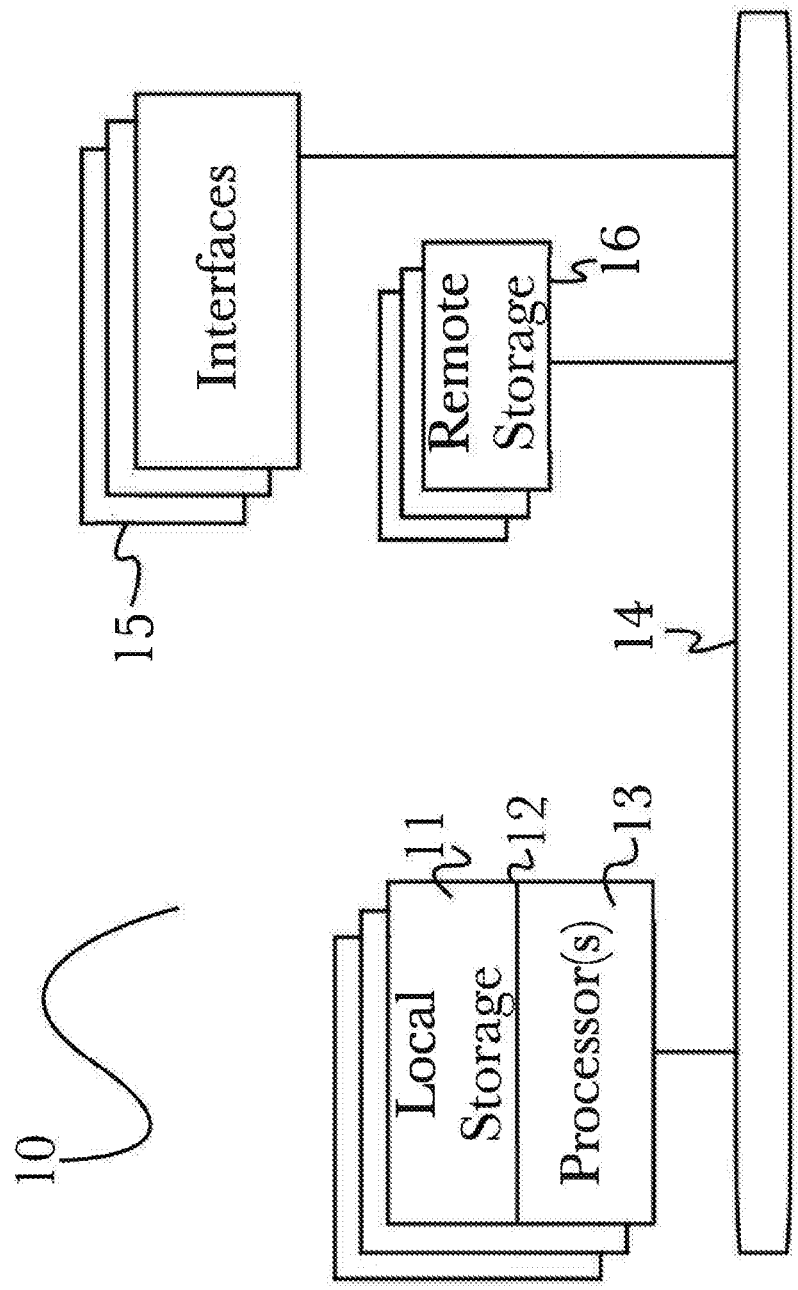
FIG. 7 is a block diagram illustrating an exemplary hardware architecture of a computing device.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 7 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
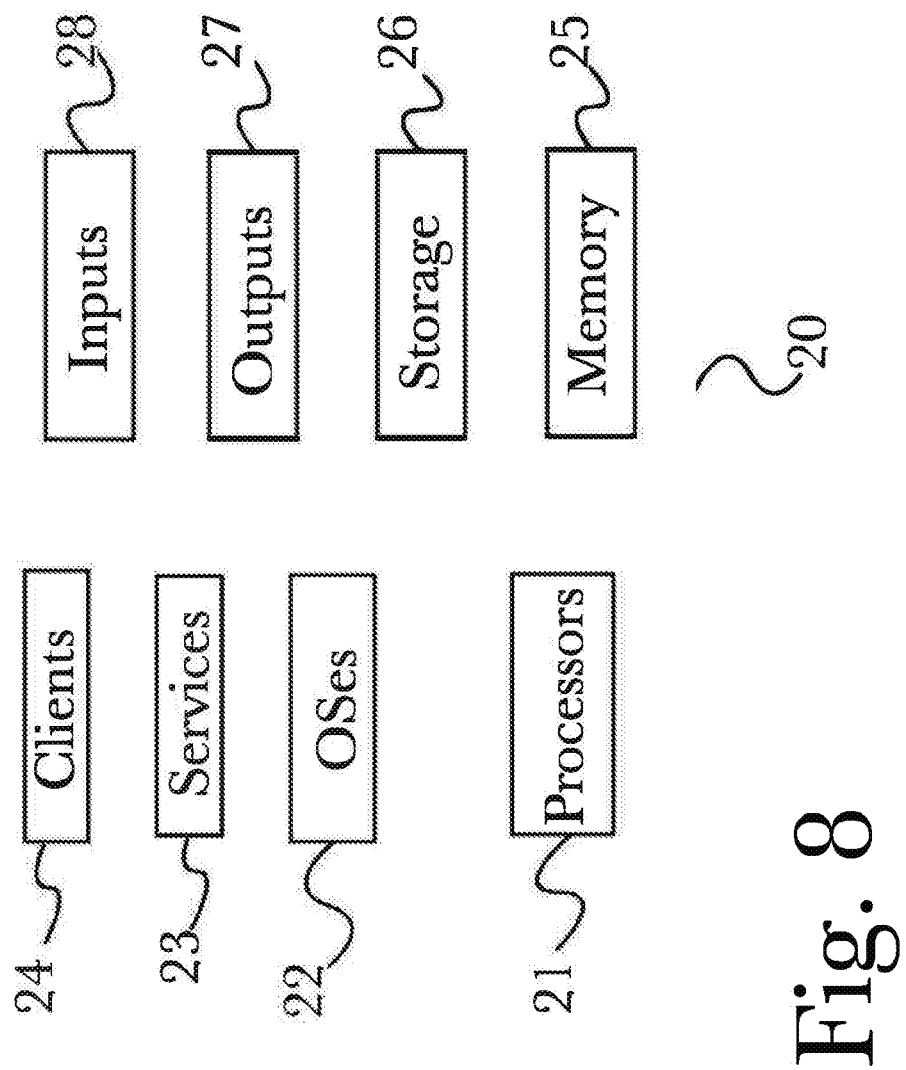
FIG. 8 is a block diagram illustrating an exemplary logical architecture for a client device.

In some aspects, systems may be implemented on a standalone computing system. Referring now to FIG. 8, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
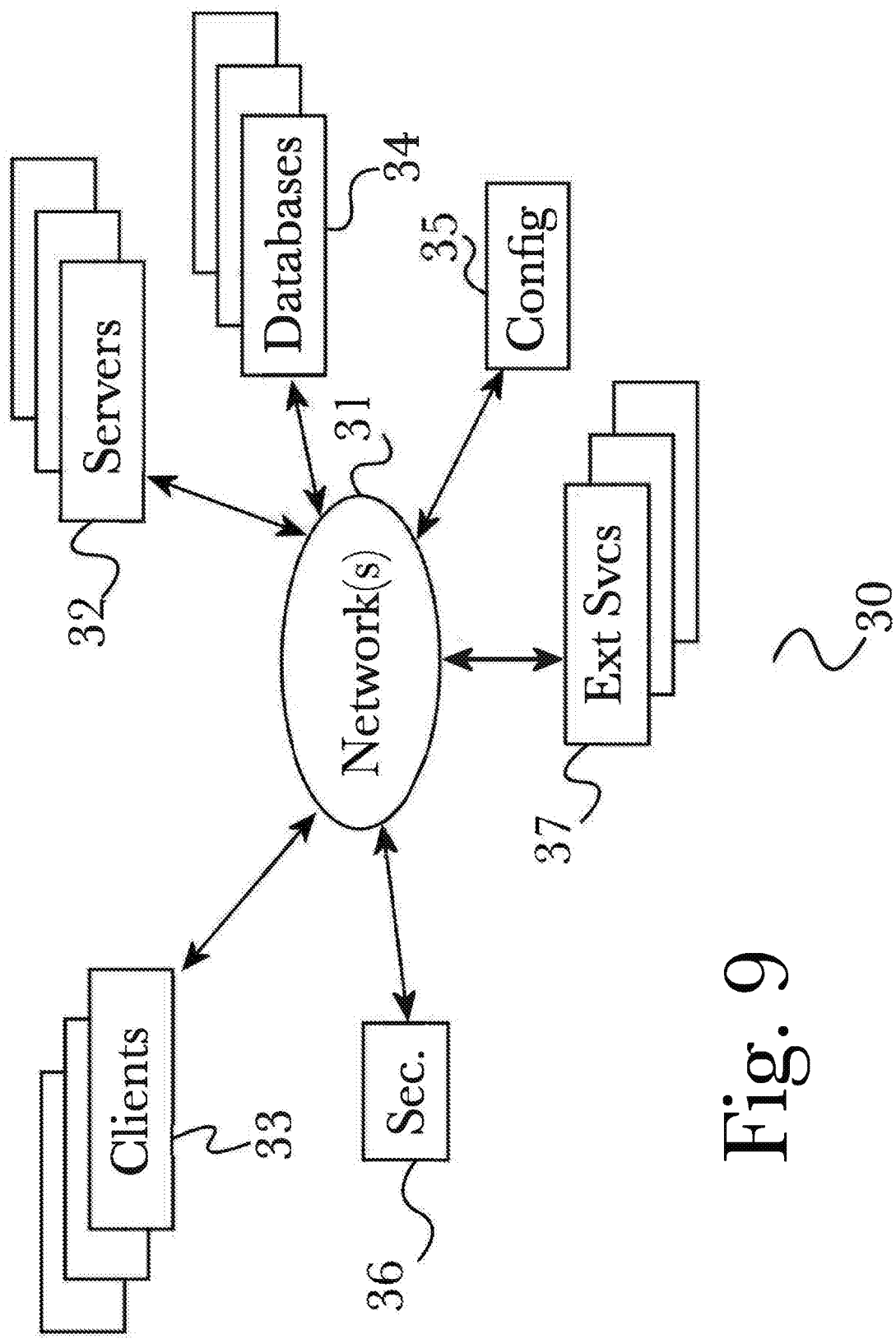
FIG. 9 is a block diagram showing an exemplary architectural arrangement of clients, servers, and external services.

In some aspects, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 10:
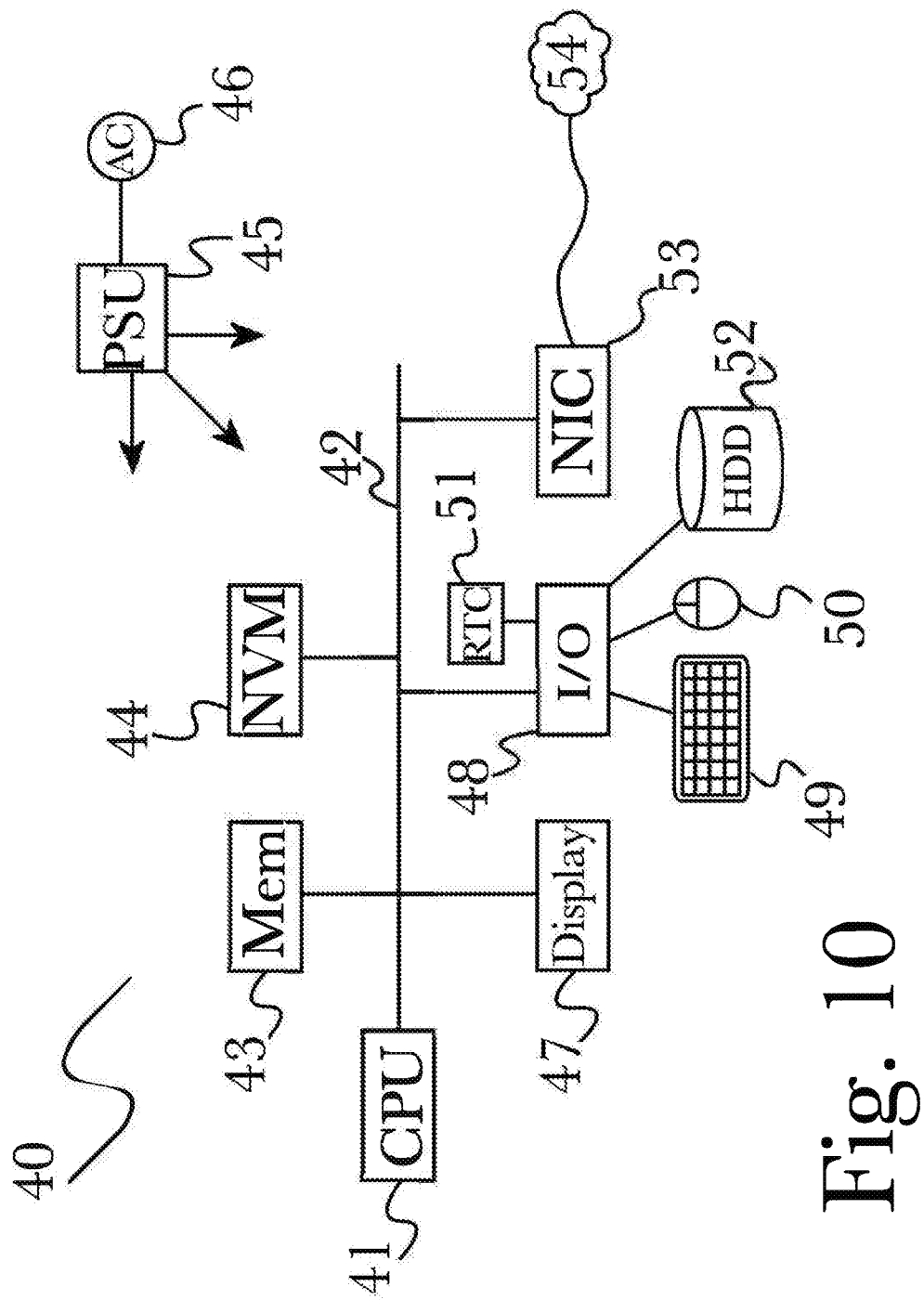
FIG. 10 is another block diagram illustrating an exemplary hardware architecture of a computing device.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A method, comprising:
   connecting, using a media redirection hardware adapter comprising a processor and a memory, a first speaker at a first position in a location, a second speaker at a second position in the location, and a mobile device;
   receiving audio content from an audio source, wherein the received audio content comprises a first set of one or more audio channels;
   separating the received audio content into a second set of two or more audio channels including both a first channel for the first speaker and a second channel for the second speaker, wherein the second set of two or more audio channels includes more audio channels than the first set of one or more audio channels;
   determining positional audio, from the received audio content, for both the first speaker and the second speaker based on the first position and the second position in the location; and
   providing the positional audio, from the received audio content, to the first speaker over the first channel and to the second speaker over the second channel.

2. The method of claim 1, further comprising:
   receiving, from the mobile device, a selection of the first speaker and the second speaker, from a plurality of speakers, to which to output the received audio content.

3. The method of claim 2, wherein the plurality of speakers includes wireless speakers.

4. The method of claim 3, wherein the plurality of speakers includes one or more speakers connected through a hardware port.

5. The method of claim 1, further comprising:
   duplicating the received audio content; and
   providing the duplicated audio content over a third channel, of the second set of two or more audio channels, to a third speaker.

6. The method of claim 1, further comprising:
   converting the received audio content from a first proprietary format to a second proprietary format.

7. The method of claim 1, wherein the mobile device comprises a mobile phone.

8. A system, comprising:
   a memory; and
   at least one processor coupled to the memory and configured to perform operations comprising:
   connecting, using a media redirection hardware adapter comprising a processor and a memory, a first speaker at a first position in a location, a second speaker at a second position in the location, and a mobile device;
   receiving audio content from an audio source, wherein the received audio content comprises a first set of one or more audio channels;
   separating the received audio content into a second set of two or more audio channels including both a first channel for the first speaker and a second channel for the second speaker, wherein the second set of two or more audio channels includes more audio channels than the first set of one or more audio channels;
   determining positional audio, from the received audio content, for both the first speaker and the second speaker based on the first position and the second position in the location; and
   providing the positional audio, from the received audio content, to the first speaker over the first channel and to the second speaker over the second channel.

9. The system of claim 8, the operations further comprising:
   receiving, from the mobile device, a selection of the first speaker and the second speaker, from a plurality of speakers, to which to output the received audio content.

10. The system of claim 9, wherein the plurality of speakers includes wireless speakers.

11. The system of claim 10, wherein the plurality of speakers includes one or more speakers connected through a hardware port.

12. The system of claim 8, the operations further comprising:
    duplicating the received audio content; and
    providing the duplicated audio content over a third channel, of the second set of two or more audio channels, to a third speaker.

13. The system of claim 8, the operations further comprising:
    converting the received audio content from a first proprietary format to a second proprietary format.

14. The system of claim 8, wherein the mobile device comprises a mobile phone.

15. A non-transitory processor-readable medium having one or more instructions operational on a client device which, when executed by a processor, cause the processor to perform operations comprising:
    connecting, using a media redirection hardware adapter comprising the processor and a memory, a first speaker at a first position in a location, a second speaker at a second position in the location, and a mobile device;
    receiving audio content from an audio source, wherein the received audio content comprises a first set of one or more audio channels;
    separating the received audio content into a second set of two or more audio channels including both a first channel for the first speaker and a second channel for the second speaker, wherein the second set of two or more audio channels includes more audio channels than the first set of one or more audio channels;
    determining positional audio, from the received audio content, for both the first speaker and the second speaker based on the first position and the second position in the location; and
    providing the positional audio, from the received audio content, to the first speaker over the first channel and to the second speaker over the second channel.

16. The non-transitory processor-readable medium of claim 15, the operations further comprising:
    receiving, from the mobile device, a selection of the first speaker and the second speaker, from a plurality of speakers, to which to output the received audio content.

17. The non-transitory processor-readable medium of claim 16, wherein the plurality of speakers includes wireless speakers.

18. The non-transitory processor-readable medium of claim 17, wherein the plurality of speakers includes one or more speakers connected through a hardware port.

19. The non-transitory processor-readable medium of claim 15, the operations further comprising:
    duplicating the received audio content; and providing the duplicated audio content over a third channel, of the second set of two or more audio channels, to a third speaker.

20. The non-transitory processor-readable medium of claim 15, the operations further comprising:
converting the received audio content from a first proprietary format to a second proprietary format.

* * * * *